TEMPERATURE AND PRESSURE STABILIZER SYSTEMS
FOR RANDOM ACCESS DISC MEMORY SYSTEMS

Filed April 17, 1963 2 Sheets-Sheet 1

INVENTORS
EUGENE G. DOMICH
ROBERT R. REISINGER
BY
Kenway, Jenney & Hildreth
ATTORNEYS INVENTOR.
EUGENE G. DOMICH
ROBERT R. REISINGER
BY Kenway, Jenney & Hildreth
ATTORNEYS

United States Patent Office 3,258,756
Patented June 28, 1966

3,258,756

TEMPERATURE AND PRESSURE STABILIZER SYSTEMS FOR RANDOM ACCESS DISC MEMORY SYSTEMS

Eugene G. Domich, Rosemont, and Robert R. Reisinger, Mahtomedi, Minn., assignors to Anelex Corporation, Boston, Mass., a corporation of New Hampshire Filed Apr. 17, 1963, Ser. No. 273,613
6 Claims. (Cl. 340—174.1)

Our invention relates to random access disc memory systems, and particularly to an improved temperature and pressure stabilizing system therefor.

Modern information processing, computing and control apparatus requires electronic storage capacity for large amounts of information. One successful storage system for this purpose has been based on the use of magnetic recording discs, together with transducer heads movable over the discs to selected storage tracks for storage and retrieval of information. Obviously, the total capacity which can be incorporated in a storage disc of a given diameter depends critically upon the accuracy with which the transducer heads can be moved to and from selected storage tracks. Also important to the determination of the amount of capacity that can be reliably incorporated in a disc memory system is the signal-to-noise ratio of the information retrieved from the system after storage therein. The primary objects of our invention are to greatly improve the accuracy with which transducer heads can be positioned adjacent the surfaces of a recording disc, and to increase the signal-to-noise ratio of random access disc memory systems.

Two effects encountered in the design, construction and operation of random access disc memory systems have served to reduce the capacity for information of such system. First, while every effort is made in the design of such system to incorporate a structural geometry, and selected materials, to be as little affected as possible by temperature changes, it has not in general been practical to design such a system in which a change in the temperature distribution will not seriously affect the relative positions of the parts. It is a specific object of our invention to provide for a uniform temperature distribution in an operating disc file. Secondly, the aerodynamic forces generated by rotation of closely spaced discs at relatively high speeds has been found to cause severe buffeting of air and fluttering of discs, with a consequent decrease in the quality of the signal recovered from or transmitted to the disc. It is a second specific object of our invention to prevent aerodynamic disc flutter in random access disc files.

Briefly, the apparatus of our invention is adapted to be employed in combination with a random access disc file of the type in which a plurality of recording discs is mounted on a common shaft for rotation about a fixed axis, and arms carrying transducer heads are positioned with respect to the discs to selected track locations thereon. Preferably, these arms are mounted to move radially with respect to the discs. In accordance with our invention, the recording heads are located along only one selected radius of each disc, with the remaining space between the discs being left free. Adjacent the heads and between the discs are mounted spoilers, which cooperate with an enlarged hub of the shaft carrying the discs to block air flow circumferentially of discs. The arms are located downstream of these spoilers, in a region of relatively undisturbed air. A housing surrounds the apparatus and is provided with openings such that in the quadrant of the discs in which the heads are located, relatively little airflow takes place and the heads are located in a quiet zone free from buffeting. At the same time, the introduction of the spoilers causes an increase in pressure upstream thereof, with a corresponding decrease in pressure downstream. The centrifugal force on the air contributed by friction with the discs tends to rotate the air at the speed of the discs. Together, these effects produce a strong flow of air through the discs and around the apparatus, tending to keep the apparatus at a stable temperature.

The manner in which the apparatus of our invention is constructed, and its mode of operation, will best be understood from the following detailed description, together with the accompanying drawings, of a preferred embodiment thereof.

Figure 1:
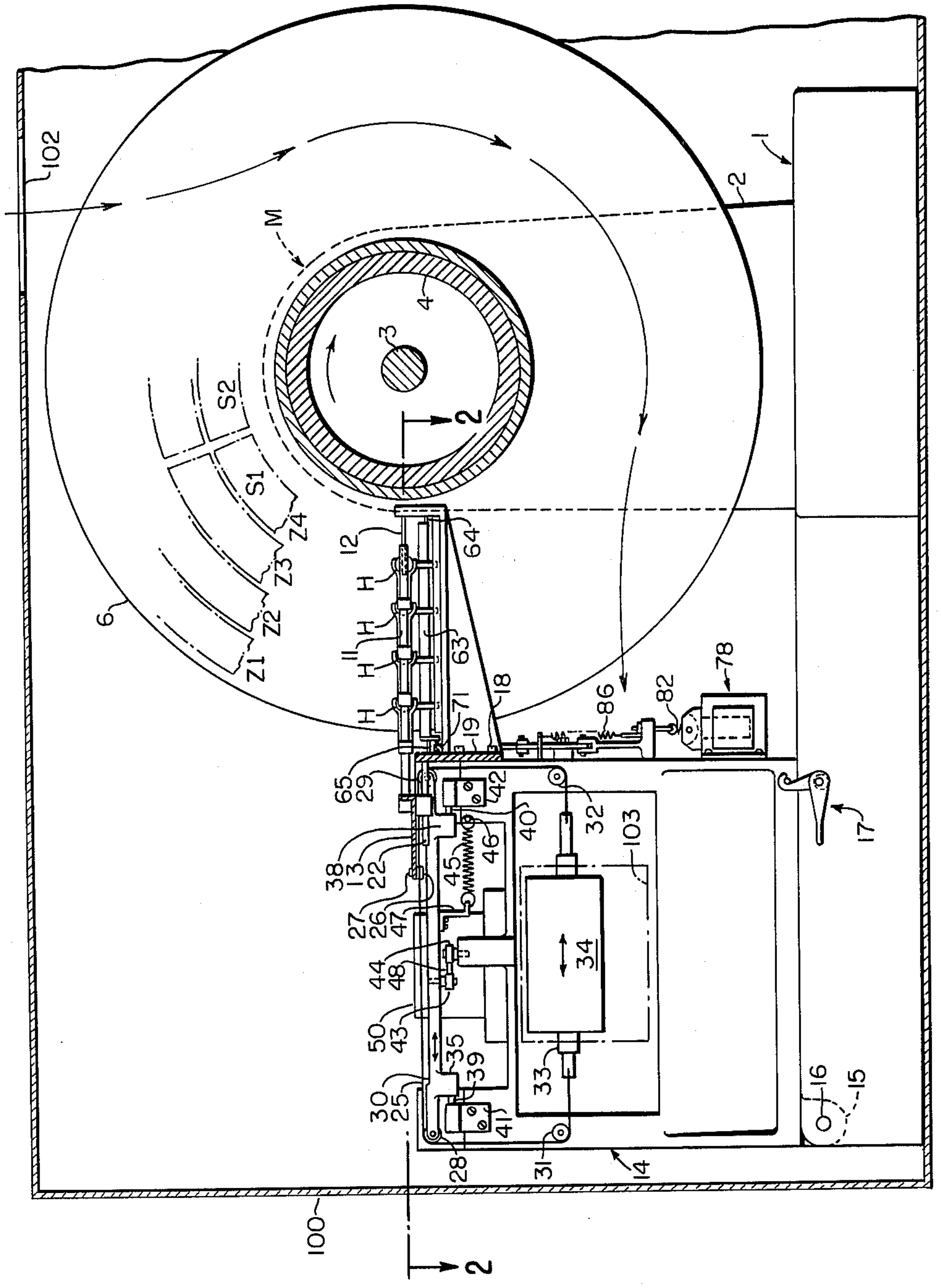
FIGURE 1 is an elevational view, with parts shown in cross section and parts broken away, of a random access disc memory unit incorporating the temperature and pressure stabilizing apparatus of our invention.

Referring first to FIGURE 1, we have shown a random access disc memory system of the type more fully shown and described in our copending U.S. application Serial Number 273,597, filed April 17, 1963, for Head Mounting and Positioning Means for Random Access Memory Systems, and also in copending application Serial Number 273,694, filed on Apr. 17, 1963 by Byron D. Smith and Robert R. Reisinger for Head Positioning Apparatus for Random Access Disc Memory System. Both of the aforesaid applications are assigned to the assignee of our invention.

Briefly, for the purposes of understanding our invention, the random access disc memory system shown in FIGURE 1 comprises a base 1 on which a pedestal 2 carrying a motor M is mounted. The motor M has a shaft 3 connected to an outer concentric enlarged shaft 4 by means of an end flange, as suggested at 5 in FIGURE 2.

Figure 2:
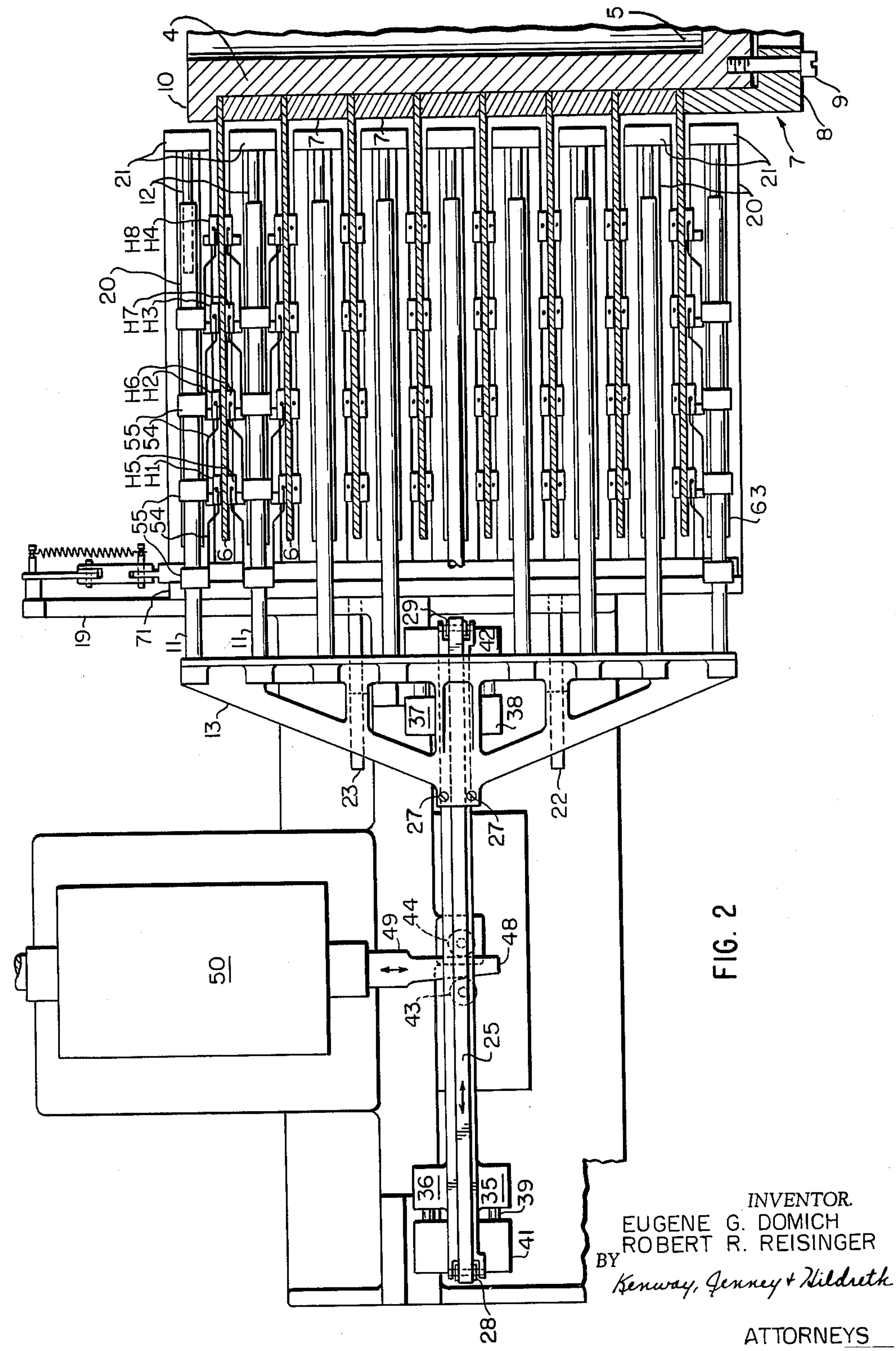
FIGURE 2 is a plan view, with parts shown in cross section and parts broken away, of a fragment of the apparatus shown in FIGURE 1 on an enlarged scale.

Carried on the enlarged shaft 4 are a plurality of magnetically coated recording discs 6, which are secured by suitable means such as the flange 10 and clamping rings 7 shown. As indicated in FIGURE 2, the end clamping ring 7 is provided with an end flange portion 8 which is apertured to receive bolts such as 9 that engage threaded apertures in the shaft 4. Upon operation of the motor M at constant speed, the discs are thus rotated in the direction indicated by the arrow. In one embodiment of our invention, the discs were rotated at 1200 r.p.m. At this speed, considerable aerodynamic disturbances are occasioned by the friction of the air between the discs, the air being dragged in a swirling fashion and tending to be thrown outward radially between the discs. A head positioning support member 14 is mounted on the base 1 of the apparatus, and carries means, described in detail in the copending application of Byron Smith and Robert R. Reisinger referred to above, for positioning a series of arms 11 mounted on a bracket 13 and carrying a plurality of magnetic transducer heads H. Briefly, this apparatus comprises a summing positioning system comprising a coarse positioner 34 which has 10 operating positions separated by about 0.2 inch, and a fine positioner 50 which is similarly operable to 10 positions separated by the same amount. As shown in FIGURE 2, the output shaft 49 of the positioner 50 is provided with a tapered extension 48 which serves to spread two rollers 43 and 44. The roller 44 is journaled in the support 14 and the roller 43 is journaled in an arm 30, which is slidably mounted on the support 14 by means of lugs such as 35 and 38 and support and guide shafts such as 39 and 40, the latter being carried in brackets such as 41 and 42 mounted on the support 14.

A metal tape 25 is connected at its ends to the ends of the output shaft of the coarse positioner 34, and is carried over rollers 31 and 32, journaled in the support 14, and rollers 28 and 29, journaled in the arm 30. It will thus be apparent that the quadrilateral defined by the tape 25 may be distorted into a parallelogram by spreading the rollers 43 and 44 without disturbing the actuating shaft 33, to move the arms 11 independently of the positioner 34, and that the tape can be translated by moving the output shaft 33 without changing the position of the rollers 43 and 44. The sum of the motions imparted by the positioners 34 and 50 is thus transmitted to the tape 25.

It should be noted in FIGURE 2 that the taper of the extension 48 of the shaft 49 reduces the movement of the arm 30 produced by a given motion of the output shaft 49. In accordance with one practical embodiment of our invention, the taper of the portion 48 was selected to give a net motion of the arm 30 of $\frac{1}{11}$ of the motion of the output shaft 33 for each step of the fine positioner, the steps of the fine positioner being equal, in this embodiment, to those of the coarse positioner.

The tape 25 is secured to the bracket 13, carrying the arms 11 previously described, such that the arms and the heads thereon are positioned to any one of a selected plurality of locations by actuating the positioners 34 and 50 to appropriate positions. This apparatus, and its function, are described in more detail in the copending applications referred to above.

Referring now to FIGURE 1, the arms 11 carrying the heads H are supported at one end by the bracket 13, which is slidably mounted on the support 14, and at the other end by rods 12, which are slidable within apertures in the tubular rods 11. These rods 12 are secured in upstanding ledges 21 formed on the spoilers 20, the latter constituting a portion of the apparatus of our invention.

The spoilers 20 are mounted on, and preferably formed integrally with, a spoiler support plate 19, which is secured to the support 14 by suitable means such as the bolts 18. As best shown in FIGURE 2, the upper portion of each spoiler is made sufficiently wide to closely approach the surfaces of the discs 6. Also, the spoilers 20 are extended into proximity with the clamping rings 70, which form a radial airflow boundary. Thus, circumferential airflow between the discs is substantially prevented by the spoilers 20.

As shown in FIGURE 1, the disc file is provided with a housing 100 in which it is substantially enclosed. The housing 100 is provided with an intake port 102, through which air can flow into the enclosure, and an outlet port 103, indicated by the dotted lines, through which air can flow out of the enclosure. When the discs 6 are operating at their design speed, such as 1200 r.p.m., it is found that a strong blast of air is forced into the port 102, generally following the arrows between the discs, and is emitted below the spoilers, where pressure builds up because of the circumferential airflow boundary provided by the spoilers. The outlet air is then forced over and around the apparatus, exiting at the port 103. In view of the fact that the discs 6 are relatively smooth in surface, constituting simply imperforate discs of aluminum coated with magnetic recording material, the force of the stream produced by rotation of the discs is surprising, and constitutes an effective means of maintaining the apparatus at a stable temperature. At the same time, the buffeting which would otherwise occur in the regions occupied by the heads, tending to distort the signals transmitted from and received by the heads, is prevented. In practice, the entire quadrant in which the heads are located, downstream of the spoilers 20 in the direction of airflow, established by the sense of rotation of the discs 6, is relatively quiet and free of turbulence. Accordingly, little difficulty is encountered in maintaining the heads in operation without vibration or buffeting.

While we have described our invention by reference to the details of a specific embodiment, many changes and variations will occur to those skilled in the art, upon reading our description, and such can obviously be made without departing from the scope of our invention.

Having thus described our invention, what we claim is:

1. Apparatus of the class described, comprising a shaft rotatably journalled in a support, at least two spaced parallel discs mounted on said axle for rotation therewith about their central axes, means for rotating said shaft and discs in a predetermined sense, said shaft comprising an imperforate cylindrical element extending between said discs, the discs being imperforate radially outward of said cylindrical element, and a spoiler mounted on said support and extending radially between said discs with clearance into proximity with said cylindrical element to substantially block the circumferential flow of air between said discs, whereby upon rotation of said discs a stream of air is produced entering the space between the discs in a region ahead of the spoiler in the sense of rotation of the discs and emerging in a region behind the spoiler.

2. In combination, a shaft rotatably mounted in a support, two spaced parallel recording discs mounted on said shaft for rotation therewith about their central axes, said shaft comprising a cylindrical portion of smaller diameter than the discs extending between the discs and forming a barrier to radial airflow between the discs, spoiler means mounted on said support and extending radially between said discs into proximity with said cylindrical portion to block circumferential airflow between said discs, and a transducer means mounted on said support adjacent said spoiler means and ahead of it in the sense of rotation of said discs for recording and reproducing information on said discs.

3. In a magnetic storage system, at least two parallel recording discs rotatably mounted on a support for rotation in a selected sense, an imperforate cylindrical surface joining the disc at an intermediate radius on each disc, said discs having confronting imperforate recording areas extending outwardly from said surface, an arm extending radially between said discs, transducer means mounted on said arm for reading and writing information on said recording areas, and an air barrier adjacent to and behind said transducer means in the sense of rotation of said discs, said barrier being spaced from and extending between said discs into proximity with said member, whereby a stream of air for maintaining stable temperature distribution in said system is produced entering between said discs in a region ahead of said transducer and emerging in a region behind said barrier in the sense of rotation of said discs, and said transducer means is protected from aerodynamic buffeting.

4. In information storage apparatus of the class comprising at least two parallel recording discs journalled in a support for rotation about a common central axis, an arm carrying transducer heads adjustably mounted on the support and extending radially between the discs, and means for rotating the discs in a predetermined sense, the combination comprising a cylindrical element, having a radius smaller than the radius of the discs less the length of the portion of the arm extending between the discs, mounted between the discs and concentric therewith to form a radial airflow boundary, and a spoiler mounted on said support and extending radially between the discs with clearance and into proximity with the cylindrical element, the spoiler being located adjacent to the area and behind it in the sense of rotation of the disc.

5. In a magnetic disc file, the combination comprising an array of recording discs of a first radius journalled on a support for rotation about a common axis, means for rotating said disc in a predetermined sense, arms adjustably mounted on the support and extending radially between said discs, transducer means mounted on said arms for reading, writing and erasing information on said discs, a radial air barrier extending between each adjacent pair of discs, concentric therewith, and having a radius smaller than said first radius, and a spoiler mounted on said support and extending radially between each adjacent pair of discs with clearance into proximity with the associated radial air barrier to substantially block circumferential flow of air between said discs, said spoilers being located adjacent the associated arms and behind them in the sense of rotation of said discs to provide a space relatively free of turbulence in which to operate the transducer means and a stream of air flowing between the discs to regulate the temperature of the disc file.

6. The apparatus of claim 3, further comprising a housing enclosing the apparatus recited, said housing having an inlet port located to admit the stream of air entering between the discs and an outlet port located to vent the emerging stream of air.

No references cited.

IRVING L. SRAGOW, *Primary Examiner.*

T. W. FEARS, *Assistant Examiner.*